April 30, 1940.   W. E. JOHNSON   2,198,723
MACHINE FOR VERIFYING STATISTICAL RECORDS
Filed July 9, 1938   4 Sheets-Sheet 1

INVENTOR
W. E. JOHNSON
BY
Sydney Page
ATTORNEY

April 30, 1940. W. E. JOHNSON 2,198,723
MACHINE FOR VERIFYING STATISTICAL RECORDS
Filed July 9, 1938 4 Sheets-Sheet 2

INVENTOR
W. E. JOHNSON
BY Sydney E. Page.
ATTORNEY

April 30, 1940.  W. E. JOHNSON  2,198,723
MACHINE FOR VERIFYING STATISTICAL RECORDS
Filed July 9, 1938  4 Sheets-Sheet 3

INVENTOR
W. E. JOHNSON
BY
Sydney E. Page
ATTORNEY

April 30, 1940.  W. E. JOHNSON  2,198,723
MACHINE FOR VERIFYING STATISTICAL RECORDS
Filed July 9, 1938  4 Sheets-Sheet 4
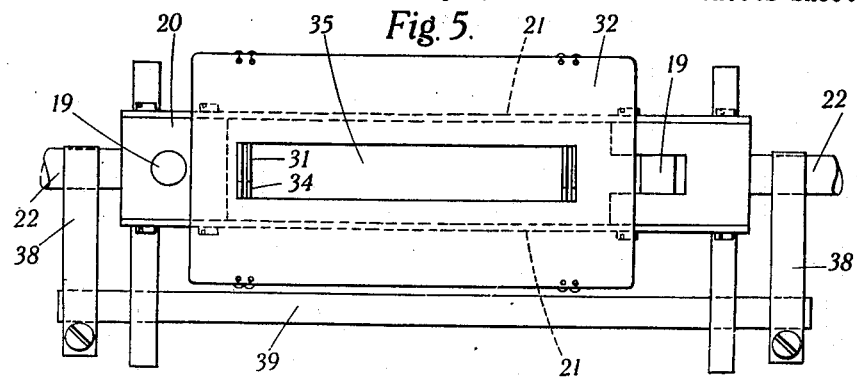
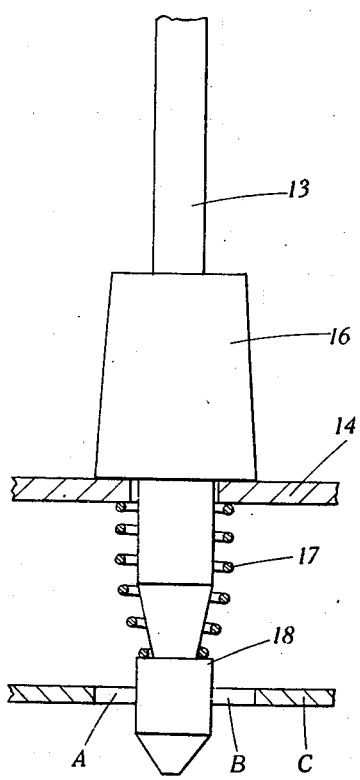
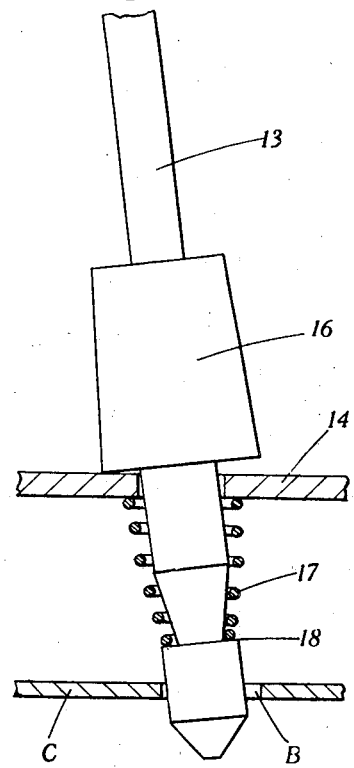
INVENTOR
W. E. JOHNSON
BY
Sydney E. Page
ATTORNEY Patented Apr. 30, 1940

2,198,723

UNITED STATES PATENT OFFICE 2,198,723

MACHINE FOR VERIFYING STATISTICAL RECORDS

William Edward Johnson, Streatham, London, England, assignor to Powers Accounting Machines Limited, London, England Application July 9, 1938, Serial No. 218,473
In Great Britain July 16, 1937

8 Claims. (Cl. 73—51)

This invention relates to machines for verifying statistical records of the kind wherein each record is formed in two stages, each complementary to the other whereby an error in recording in one stage is indicated by the record being incomplete or of an incorrect shape.

A method of and machine for making such records are described and claimed in U. S. patent specification No. 1,969,332.

According to the present invention a machine for verifying record cards in which each perforation is formed in two complementary stages includes a column of sensing elements having as many sensing elements as there are hole positions in a card column, said sensing elements being so located with respect to the hole positions in the card that a complete hole permits the corresponding sensing element to pass freely through it whereas an incomplete hole causes lateral displacement of the sensing element, together with means for testing the position of each sensing element after each card has been sensed and means for giving an indication when any sensing element has been displaced.

Preferably the sensing elements are in the form of pins disposed in a vertically reciprocable carrier each pin being mounted so that it is free to rock or tilt about a point near the sensing end of the pin and associated with each pin is a centralising spring serving normally to maintain the pin vertical.

With such an arrangement when the pin carrier descends to the card those pins which find complete holes pass through them freely and remain in the vertical position. When any pin finds an incomplete record the lower end of the pin, which is tapered, or otherwise provided with a lead, strikes the edge of the incomplete hole and is deflected to one side. Consequently the pin rocks about its point of support and the upper end of the pin is displaced in the opposite direction. By mounting the pin to rock about a point distant from its upper end by three quarters of the length of the pin a displacement of the upper end of the pin equal to about three times the displacement of the lower end thereof is obtained.

The means for testing the positions of the pins may comprise a plate arranged to reciprocate with the sensing pin carrier but independently thereof, said plate being however adapted normally to descend further than the pin box and provided with recesses to receive the upper ends of the pins when the plate so descends. If any pin is displaced however, as described above, the upper end thereof is engaged by the surface of the plate between two recesses and complete descent of the plate is prevented.

This obstruction of the movement of the plate is used according to a feature of the invention to give an indication of an incorrect card, and may for example initiate the operation of mechanism for inserting a signal card of a distinctive colour into the pack of cards in order to indicate the location of the incorrect card.

One construction according to the invention will now be described with reference to the accompanying drawings by way of example as applied to the verification of perforated record cards of the kind in which each record perforation comprises two overlapping circular holes.

In the drawings:

Fig. 4 shows a detail of the mechanism,

Fig. 5 is a plan of part of the machine shown in Fig. 1,

Fig. 6 is an enlarged view of a portion of a sensing pin illustrating the sensing of a correctly punched hole, Fig. 7 is an enlarged view of a portion of a sensing pin, illustrating the sensing of an incorrectly punched hole.

Fig. 8 is a plan view of the hole in the card shown in Fig. 6 and

Fig. 9 is a plan view of the hole in the card shown in Fig. 7.

Figure 1:
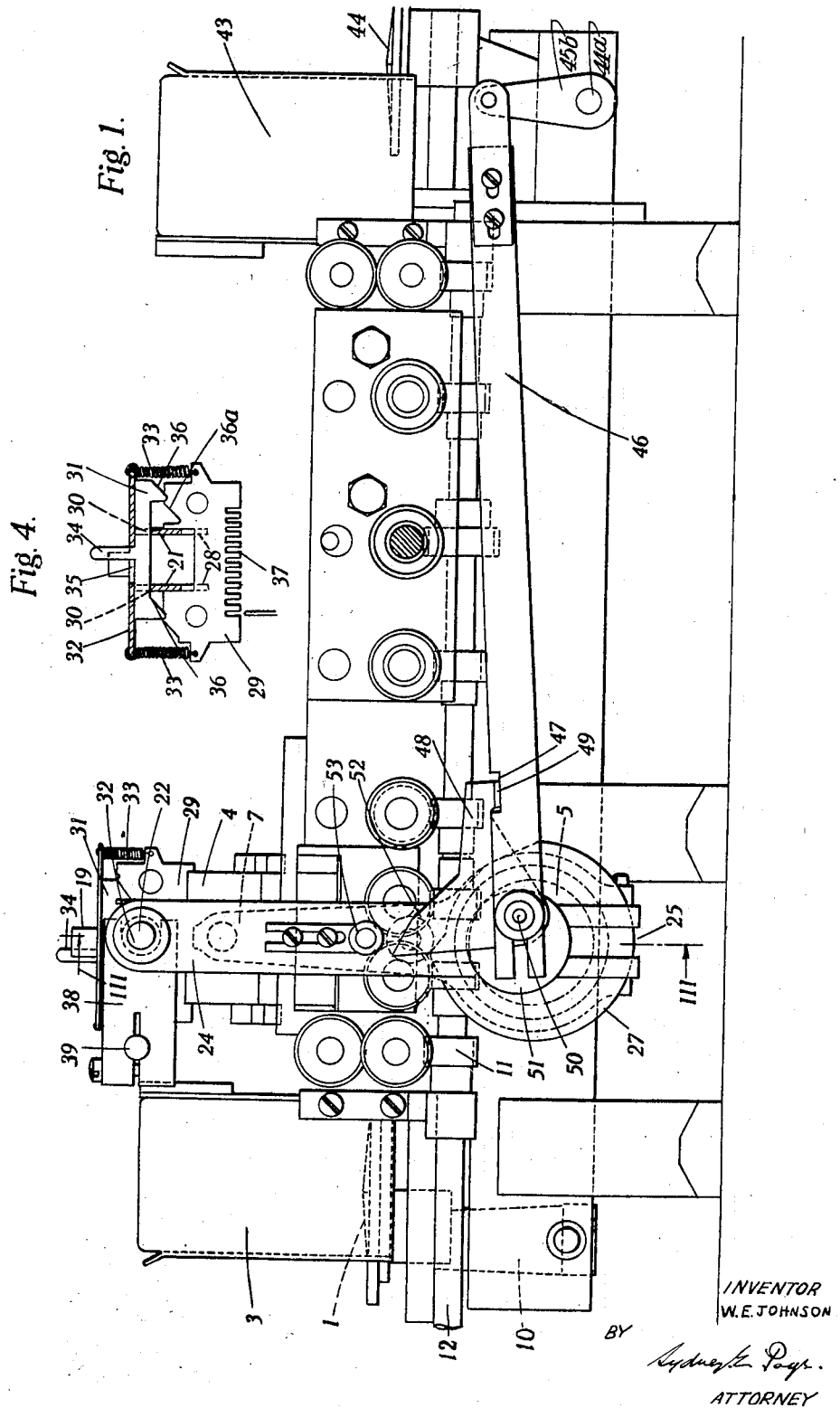
Fig. 1 is an outside elevation.

In the construction illustrated in the drawings the cards are fed by means of a picker 1 and feed rolls 2 from a magazine 3 to a sensing device comprising a frame 4 reciprocated by eccentrics 5 on a main shaft 6 through connecting rods 7 and carrying as many columns of sensing pins as there are columns on a card.

The picker 1 is actuated from an eccentric 8 on the main shaft 6 through a link 9 and arm 10, and the feed rolls 2 are driven through the usual skew gearing 11 including the shaft 12, which is driven from the main shaft 6 through worm gearing 12a.

The lower ends of the sensing pins 13 are guided in holes in a plate 14 mounted in the frame 4 and the upper ends of the pins 13 are guided between rods 15 which run longitudinally of the columns of pins.

Each pin 13 is formed with a collar 16 near its lower end. This collar 16 rests on the guide plate 14, being pressed into contact therewith by a spring 17 disposed around the pin below the guide plate 14. The lowermost coil of this spring engages a shoulder 18 formed on the pin whereby the spring urges the pin downwardly and maintains it normally in a vertical position.

Each pin 13 passes with clearance through the guide plate 14 so that it can rock about the collar 16 to either side of the normal vertical position, the spring 17 however serving to centralise the pin or bring it back to the vertical position after it has been displaced therefrom.

In order to restrict the rocking movement of the pin 13 to one plane the upper ends of all the pins of one column are guided between two rods 15, so that the upper end of the pin can be displaced laterally in either direction longitudinally of the rods but not transversely thereof.

The pins 13 are so located with respect to the hole positions in the cards that when a complete hole, i. e. one in which both the circular overlapping parts A and B in the card C are present, is detected the lower end of the pin passes freely through the hole without touching the sides thereof (see Figs. 6 and 8).

If, however, only one of the circular holes (A or B) is present then the lower end of the pin will engage one side or other of the hole as the pin descends and will be deflected to one side or other of the vertical position or centre line thereby rocking the pin about its collar 16 and displacing the upper end of the pin about its collar 16 and displacing the upper end of the pin in the opposite direction and to a greater extent owing to the fact that the portion of the pin 13 above the collar 16 is relatively long compared with the portion below the collar (see Figs. 7 and 9).

In order to facilitate entry of the pin into an incomplete hole, the lower end thereof is tapered in order to give the pin a lead.

The pin-carrying frame or pin-box 4 is mounted to reciprocate on posts 19 secured to bars 19a attached to the side plates 19b of the machine frame. Also mounted to reciprocate on these posts 19 is a device for testing whether the pins have sensed a correctly punched hole or an incorrectly punched hole.

This testing device is in the form of a frame, comprising two end blocks 20, connected by side plates 21. Each block 20 has a trunnion 22 carrying at its end an eccentric bush 23 whereby the block 20 is pivoted to an operating link 24, the eccentric bush being provided for the purpose of adjustment.

The lower end of each link 24 is forked at 25 to pass over the main shaft 6 and carries a roller 26 engaging with a cam 27 on the said main shaft.

Each of the side plates 21 is formed with a plurality of slots 28 in its lower edge, one for each column of pins 13, and in each of these slots is mounted a separate testing plate 29.

Each of the side plates 21 is also formed with a plurality of slots 30 in its upper edge, one for each column of pins 13, and in each of these slots 30 is mounted a separate control slide 31.

The testing frame also includes a top plate 32 secured to the end blocks 20 and each of the testing plates 29 is connected to the plate 32 by two springs 33 which urge the associated plate 29 upwardly.

The function of the control slides 31 is to render the associated testing plates 29 operative or inoperative at will so that the particular column in respect of which the machine shall be operative may be predetermined.

Figure 2:
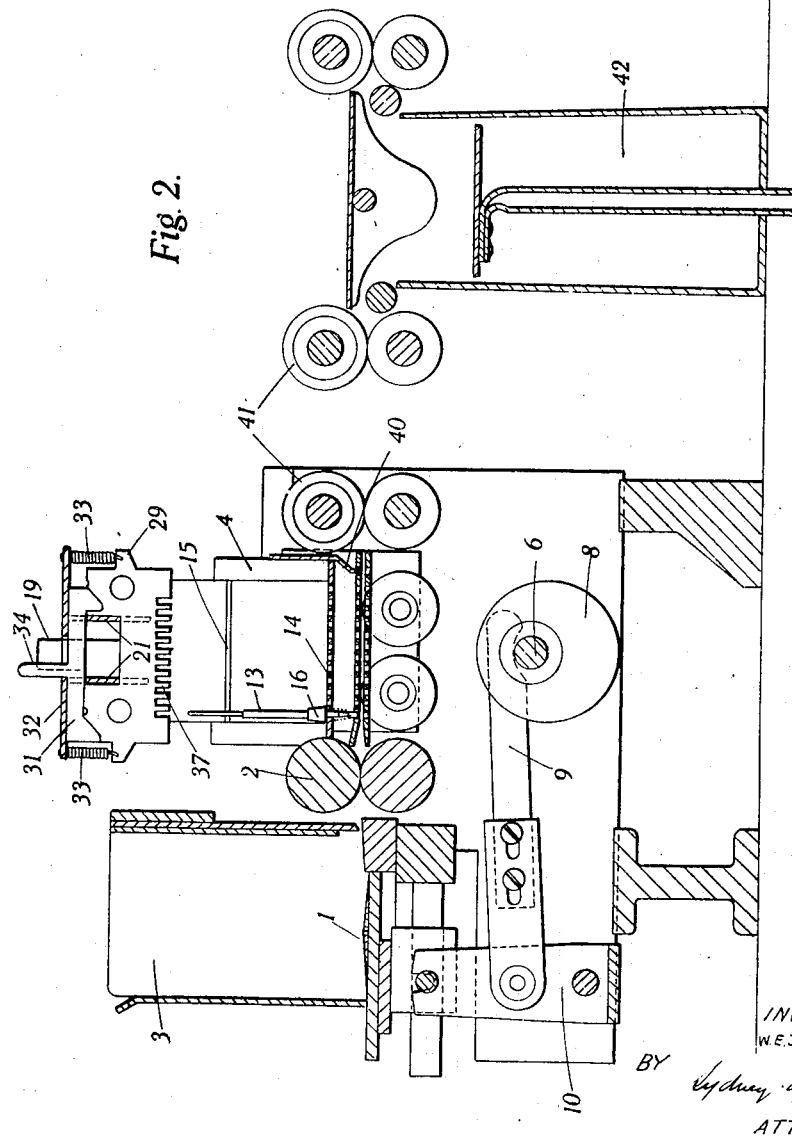
Fig. 2 is a longitudinal section on the line II—II of Fig. 1.
Figure 3:
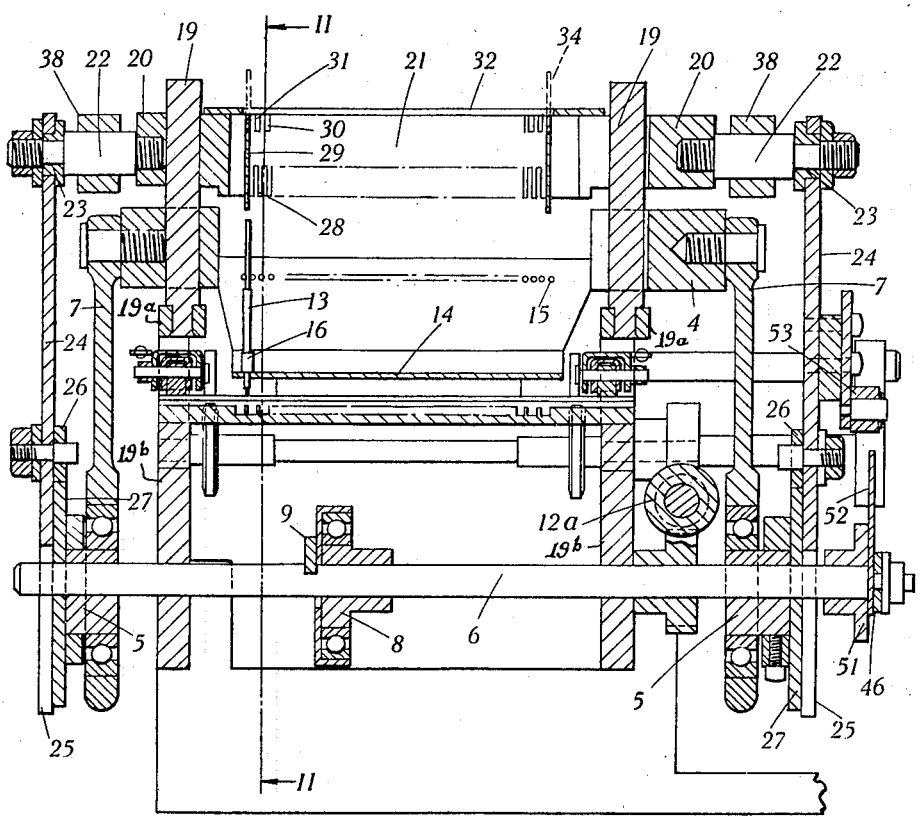
Fig. 3 is a transverse section on the line III—III of Fig. 3.

In Fig. 2 a control slide 31 and its associated testing plate 29 are shown in the relative positions which they occupy when the testing plate is inoperative.

Each control slide 31 has an operating handle 34 projecting through an aperture 35 in the top plate 32 and by pushing the slide 31 to the right in Fig. 2 into the position shown in Fig. 4 the plate 29 is rendered operative. The plates 29 and slides 31 have cam surfaces 36, 36a which cooperate, when the slide 31 is moved to the right in Fig. 2 to the position shown in Fig. 4; these cam surfaces force the testing plate 29 downwardly against the action of the springs 33 into the operative position.

Each of the testing plates 29 has a plurality of slots 37, one for each pin 13 in the associated column, formed in its underside.

The cams 27 are so shaped that the testing frame with the plates 29 can descend until the undersurface of the plates 29 is below the upper ends of the sensing pins 13, and normally, when all the holes are complete so that the pins 13 remain vertical this complete descent of the testing frame is permitted due to the fact that the upper ends of the pins 13 enter the slots 37 in the plates 29. Those pins 27 which do not find a hole are arrested before the pin-carrying frame has fully descended and consequently their upper ends will project above the upper ends of the pins which have passed through holes in the card. Accordingly the slots 37 in the testing plates 29 are made deep enough to accommodate the ends of such pins as do not find a hole.

On the other hand if a pin 13 finds an incomplete hole its upper end will be displaced to one side as described above.

Consequently the upper end of this pin will engage the undersurface of the associated testing plate 29 between two adjacent slots 37 and will prevent the full descent of the testing frame.

In order to ensure parallelism of the testing frame each trunnion 22 is embraced by the end of an arm 38 secured to a cross shaft 39 (Fig. 5).

During sensing each card is held in position by a card stop 40 carried by the pin box 4 and after the sensing operation is completed the cards are conveyed by feed rolls 41 to a receptacle 42.

In order to indicate the location of an incorrect card it is desired to insert a signal card into this receptacle 42 adjacent to the incorrect card and in the construction now being described the obstruction of the descent of the testing frame due to the sensing of an incorrect card is employed to control the insertion of such a signal card.

The signal cards are contained in a magazine 43 having a picker 44 for feeding the signal cards, said picker being actuated by an arm 45 secured to a shaft 45a carrying another arm 45b actuated by a normally inoperative link 46.

This link 46 has a recess 47 in its upper edge above which reciprocates an arm 48 provided with a lug 49. This arm 48 is conveniently constituted by one arm of a bell crank pivoted at 50 to a disc 51 secured to the main shaft 6.

The other arm 52 is formed with a cam surface of the bell crank standing in the path of a roll 53 on one of the two links 24 which are actuated by the cams 27 to lift the testing frame. When the testing frame descends to its full extent the roll 53 strikes the arm 52 of the bell crank and rocks it so as to hold the lug 49 clear of the recess 47 in the link 46 which operates the picker 44 for the signal cards.

If the descent of the testing frame is obstructed by the sensing of an incorrect card the roll 53 does not rock the bell crank 52—48 and consequently the lug 49 drops into the recess 47 and as the disc 51 rotates the link 46 is actuated and operates the picker 44 to feed a signal card into the receptacle 42 which receives the verified cards.

From the foregoing it will be understood that the invention includes a machine for verifying perforated record cards wherein the record perforations have a predetermined shape, comprising sensing elements which are adapted to be displaced by engagement with the edge of a hole of incorrect shape, together with means controlled by said displacement for giving an indication of the existence of the incorrect hole.

Constructions according to the present invention have the advantage that the pins may be placed relatively close together so that cards of standard size but having 80 columns of hole positions may be rapidly and accurately verified.

What I claim is:

1. A machine for verifying statistical record cards of the kind wherein each perforation is made in two complementary stages, including in combination a carrier, means for reciprocating said carrier, a column of sensing pins, one for each hole position in a card column, each of said pins being mounted in the carrier so that it is free to rock about a point near its sensing end to either side of a centre line located at right angles to the plane of the card, a centralising spring associated with each pin and tending to maintain the pin at right angles to the plane of the card, and central of its associated hole when a card is in the machine, whereby a complete hole permits the pin to pass freely through it whereas an incomplete hole causes tilting of the pin to one side or other of the centre line against the action of the centralising spring by engagement of the sensing end of the pin with one side of the hole, means for testing the position of each sensing pin after each sensing operation, and means operative under the control of said testing means to give an indication when a sensing pin has been tilted to either side of the centre line.

2. A machine for verifying statistical record cards of the kind wherein each perforation is made in two complementary stages, including in combination a carrier, means for reciprocating said carrier, a column of sensing pins, one for each hole position in a card column, each of said pins being mounted in the carrier so that it is free to rock about a point near its sensing end to either side of a centre line located at right angles to the plane of the card, a centralising spring associated with each pin and tending to maintain the pin at right angles to the plane of the card, and central of its associated hole when a card is in the machine, whereby a complete hole permits the pin to pass freely through it whereas an incomplete hole causes tilting of the pin to one side or other of the centre line against the action of the centralising spring by engagement of the sensing end of the pin with one side of the hole, means for testing the position of each sensing pin after each sensing operation, said testing means comprising a plate located adjacent the free ends of the pins and having an operative surface facing and parallel to the card plane, said operative surface being formed with recesses, one for each pin, means for reciprocating said plate synchronously with and in the same direction as the sensing pin carrier whereby when all the pins pass freely through holes in a card the free ends of said pins enter the recesses in the testing plate, whereas when a pin is tilted to either side of the centre line by engagement with the side of an incomplete hole, the free end of said pin engages the operative surface of the plate between two recesses and prevents complete movement of said plate, and means operative under the control of the testing plate to give an indication when complete movement of said plate is so prevented.

3. A verifying machine according to claim 2, including normally inoperative mechanism for inserting a signal card into the pack of verified cards, and means actuated under the control of the testing plate when its complete movement is prevented for rendering said signal card inserting means operative.

4. A machine for verifying statistical record cards of the kind wherein each perforation is made in two complementary stages, including in combination a carrier, means for reciprocating said carrier, a column of sensing pins, one pin for each hole position in a card column, each of said pins being mounted in the carrier so that it is free to rock about a point near its sensing end, a centralising spring associated with each pin and tending to maintain the pin at right angles to the plane of the card, and central of its associated hole when a card is in the machine, whereby a complete hole permits the pin to pass freely through it whereas an incomplete hole causes tilting of the pin against the action of the centralising spring by engagement of the sensing end of the pin with one side of the hole, a frame, a plurality of individual testing plates mounted in said frame, one plate for each column of pins, each plate having an operative edge facing the free ends of the pins in the associated column and parallel to said column, each testing plate also having formed in its operative edge a series of recesses, one for each pin in the associated column, means for reciprocating said frame synchronously with, and in the same direction as the pin carrier, whereby when all the pins pass freely through holes in a card, the free ends of said pins enter the recesses in the associated testing plate, whereas when a pin is tilted by engagement with the side of an incomplete hole the free end of said pin engages the operative edge of the associated testing plate between two recesses and prevents complete movement of the frame, means operative under the control of the frame to give an indication when complete movement of said frame is so prevented, and means individual to each testing plate for withdrawing the operative edge of said plate out of range of the associated column of sensing pins whereby any column of pins can be rendered operative or inoperative at will.

5. A verifying machine according to claim 4, including normally inoperative mechanism for inserting a signal card into the pack of verified cards, and means actuated under the control of the testing frame when its complete movement is prevented for rendering said signal card inserting means operative.

6. A verifying machine according to claim 1, wherein the pin carrier includes a plate having holes to receive the pins and each pin has a collar whereby it can engage the plate, while at its sensing end each pin is reduced to form a shoulder against which the spring abuts, the other end of the spring abutting on the opposite side of the plate from that which is engaged by the collar.

7. A verifying machine according to claim 4, wherein the pin carrier includes a plate having holes to receive the pins and each pin has a collar whereby it can engage the plate, while at its sensing end each pin is reduced to form a shoulder against which the spring abuts, the other end of the spring abutting on the opposite side of the plate from that which is engaged by the collar.

8. A verifying machine according to claim 2, including a card receiver, means for delivering verified cards into said receiver, a signal card magazine, a picker for delivering cards from said magazine to said card receiver, a normally inoperative actuating link for said picker, said link having a recess, an operating member for said link, said operating member having a lug, means tending to cause said lug to engage the recess in the actuating link and means operated by the testing plate when said plate moves to its fullest extent to hold said lug out of engagement with the recess in the actuating link, whereby when the testing plate moves to its fullest extent the signal card picker is not actuated whereas when the movement of the testing plate is incomplete the lug engages the recess and the signal card picker is actuated to feed a signal card into the receiver.

WILLIAM EDWARD JOHNSON.